United States Patent
Lin et al.

(10) Patent No.: US 10,634,844 B1
(45) Date of Patent: Apr. 28, 2020

(54) OPTICAL MULTIPLEXER\DEMULTIPLEXER WITH INPUT AND OUTPUT PORTS ON A SINGLE SIDE, AND AN OPTICAL TRANSCEIVER IMPLEMENTING SAME

(71) Applicant: Applied Optoelectronics, Inc., Sugar Land, TX (US)

(72) Inventors: Kai-Sheng Lin, Sugar Land, TX (US); Qin Li, Houston, TX (US); Chong Wang, Stafford, TX (US)

(73) Assignee: Applied Optoelectronics, Inc., Sugarland, TX (US)

( * ) Notice: Subject to any disclaimer, the term of this patent is extended or adjusted under 35 U.S.C. 154(b) by 0 days.

(21) Appl. No.: 16/281,464

(22) Filed: Feb. 21, 2019

(51) Int. Cl.
- *G02B 6/12* (2006.01)
- *G02B 6/42* (2006.01)
- *H04J 14/02* (2006.01)
- *G02B 6/293* (2006.01)
- *G02B 6/34* (2006.01)

(52) U.S. Cl.
CPC ....... *G02B 6/12019* (2013.01); *G02B 6/2938* (2013.01); *G02B 6/4246* (2013.01); *G02B 6/4284* (2013.01); *H04J 14/0278* (2013.01); *G02B 6/34* (2013.01)

(58) Field of Classification Search
CPC .............. G02B 6/12019; G02B 6/2938; G02B 6/4246; G02B 6/4284; G02B 6/26; G02B 6/34; G02B 6/42; G02B 6/43; G02B 6/12016; G02B 6/12028; G02B 6/13; H04J 14/0278; H04J 14/02; H04B 10/69; H04B 10/80; H04B 17/00

USPC .......................................................... 398/87
See application file for complete search history.

(56) References Cited

U.S. PATENT DOCUMENTS

| | | | |
|---|---|---|---|
| 8,521,020 B2* | 8/2013 | Welch | B82Y 20/00 398/193 |
| 9,455,782 B2* | 9/2016 | Zheng | H04B 10/07955 |
| 9,847,434 B2* | 12/2017 | Ho | H01L 31/0203 |
| 9,891,395 B2* | 2/2018 | Lin | G02B 6/4246 |
| 9,964,720 B2* | 5/2018 | Zheng | H04J 14/02 |
| 10,277,330 B2* | 4/2019 | Sipes, Jr. | H04N 21/4436 |
| 2002/0001432 A1* | 1/2002 | Ueda | G02B 6/12014 385/37 |

(Continued)

*Primary Examiner* — Abbas H Alagheband
(74) *Attorney, Agent, or Firm* — Grossman Tucker Perreault & Pfleger, PLLC; Norman S. Kinsella

(57) ABSTRACT

A multi-channel transceiver, consistent with the present disclosure, includes a multiplexer/demultiplexer (MUX/DEMUX) device configured to be shared by, and support operations of, a multi-channel transmitter optical subassembly (TOSA) and multi-channel receiver optical subassembly (ROSA) within a single transceiver housing. The shared MUX/DEMUX device may be referred to herein as simply a shared AWG for ease of description and not for purposes of limitation. The shared AWG receives optical signals from a plurality of TOSA modules at different channel wavelengths via a plurality of mux input ports, and then combines the optical signals into a multiplexed optical signal, with the multiplexed optical signal being output via a mux output port. In addition, the shared AWG receives an optical signal having different channel wavelengths at a demux input port and separates channel wavelengths to be output via a plurality of demux output ports.

18 Claims, 5 Drawing Sheets

(56) References Cited

U.S. PATENT DOCUMENTS

| | | | | |
|---|---|---|---|---|
| 2002/0044742 A1* | 4/2002 | Yoneda | ............... | G02B 6/12014 385/37 |
| 2004/0096151 A1* | 5/2004 | Svilans | .................... | G01J 3/12 385/27 |
| 2007/0065076 A1* | 3/2007 | Grek | .................. | G02B 6/12016 385/37 |
| 2009/0154880 A1* | 6/2009 | Song | .................. | G02B 6/12011 385/46 |
| 2009/0263084 A1* | 10/2009 | Yamada | ............. | G02B 6/12016 385/37 |
| 2010/0150499 A1* | 6/2010 | Kim | .................. | G02B 6/12011 385/37 |
| 2012/0087620 A1* | 4/2012 | Pardo | ................. | H04B 10/506 385/14 |
| 2012/0087623 A1* | 4/2012 | Neilson | ................ | H04B 10/506 385/24 |
| 2015/0188291 A1* | 7/2015 | Tan | ......................... | H01S 5/068 385/14 |
| 2015/0229400 A1* | 8/2015 | Oguma | .............. | G02B 6/12011 398/79 |
| 2017/0195079 A1* | 7/2017 | Zheng | .................... | H04B 10/40 |
| 2017/0307819 A1* | 10/2017 | Ho | ..................... | G02B 6/12016 |
| 2017/0359125 A1* | 12/2017 | Ho | ...................... | H04J 14/0256 |
| 2019/0199448 A1* | 6/2019 | Sipes, Jr. | ............ | H04N 21/4436 |

\* cited by examiner

US 10,634,844 B1

OPTICAL MULTIPLEXER\DEMULTIPLEXER WITH INPUT AND OUTPUT PORTS ON A SINGLE SIDE, AND AN OPTICAL TRANSCEIVER IMPLEMENTING SAME

TECHNICAL FIELD

The present disclosure relates to optical transceivers, and more particularly, to an optical transceiver including a shared multiplexer/demultiplexer, e.g., arrayed waveguide grating (AWG), with input and output ports on a single side to support both transmit and receive operations.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver. The heat generated by lasers in the TOSA(s) within a small space may also adversely affect performance of optical components, such as the optical multiplexer.

BRIEF DESCRIPTION OF THE DRAWINGS

These and other features and advantages will be better understood by reading the following detailed description, taken together with the drawings wherein.

DETAILED DESCRIPTION

Figure 1:
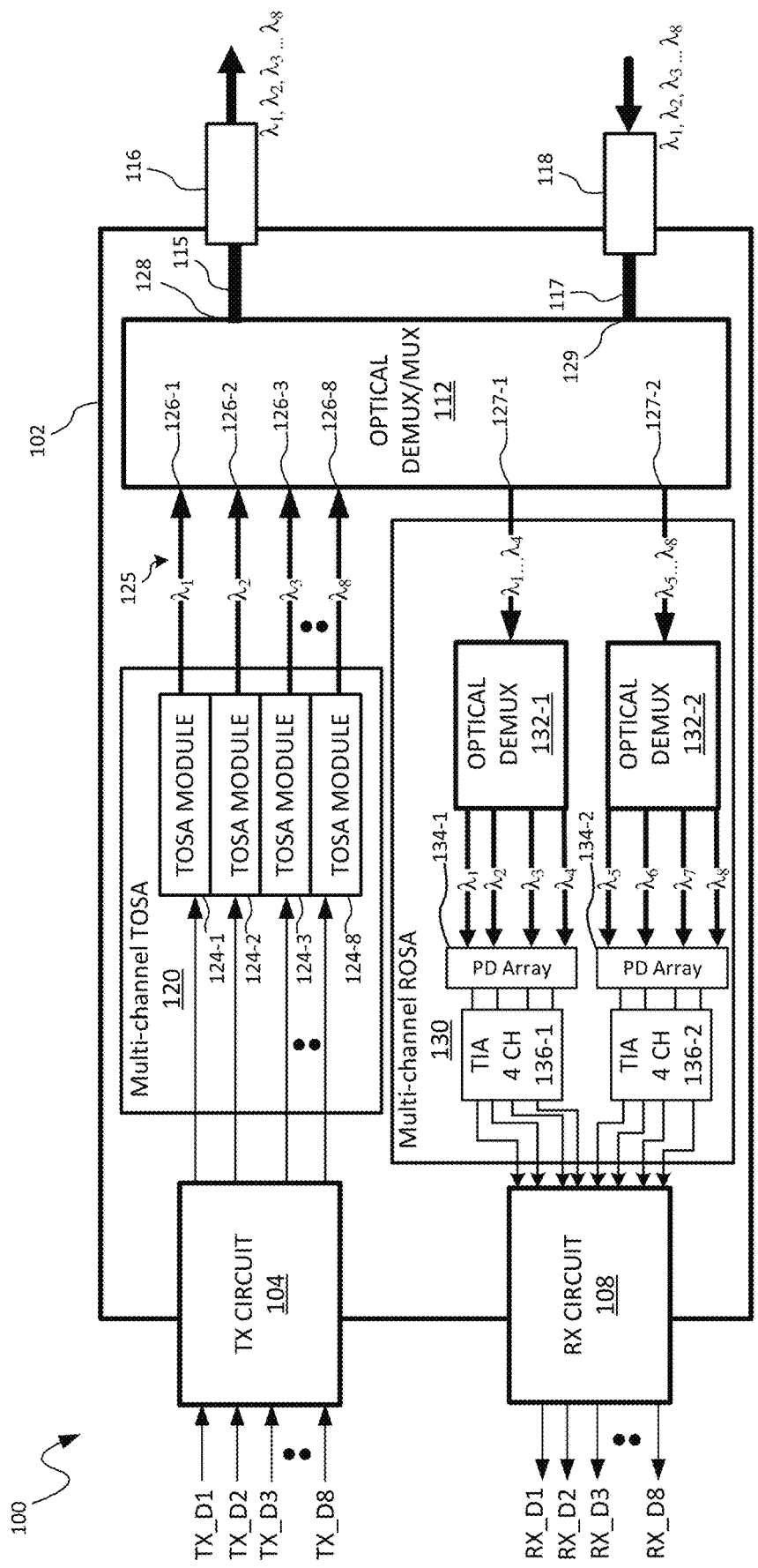
FIG. 1 is a schematic diagram of a multi-channel optical transceiver including a multi-channel transmitter optical sub-assembly (TOSA) and multi-channel receiver optical sub-assembly (ROSA), consistent with embodiments of the present disclosure.

A multi-channel transceiver, consistent with the present disclosure, includes a multiplexer/demultiplexer (MUX/DE-MUX) configured to be shared by, and support operations of, a multi-channel transmitter optical subassembly (TOSA) and multi-channel receiver optical subassembly (ROSA) within a single transceiver housing. The shared MUX/DEMUX device may be referred to herein as simply a shared AWG for ease of description and not for purposes of limitation. The shared AWG receives optical signals from a plurality of TOSA modules at different channel wavelengths via a plurality of mux input ports, and then combines the optical signals into a multiplexed optical signal, with the multiplexed optical signal being output via a mux output port. In addition, the shared AWG receives a multiplexed optical signal (or input multiplexed optical signal) having different channel wavelengths at a demux input port and separates channel wavelengths to be output via a plurality of demux output ports. The shared AWG separates and outputs a predetermined portion/group of channel wavelengths, e.g., channel wavelengths $\lambda_1$-$\lambda_4$, via a first demux output port and a second, non-overlapping portion of channel wavelengths, e.g., $\lambda_5$-$\lambda_8$, via a second demux output port. To this end, the shared AWG provides a first stage of demultiplexing whereby groups of channel wavelengths may be separated into multiple optical signals rather than each individual wavelength being separated from each other and output via an associated optical signal. Thus, the first demultiplexing stage includes two or more demux output ports of the shared AWG outputting optical signals with a respective half, quarter, or other number of the total number of channel wavelengths that were multiplexed into the input multiplexed optical signal. Note, while the present disclosure references demultiplexing a multiplexed optical signal into different "portions" of channel wavelengths, the term "portion" refers to separating multiple channel wavelengths rather than splitting/separating a channel wavelength into separate portions. The multi-channel ROSA then provides a second stage of the demultiplexing, e.g., using N-number of optical demultiplexers, to separate individual channel wavelengths from their respective group in each optical signal for detection purposes.

In accordance with an embodiment, the shared AWG includes a plurality of mux input ports, a mux output port, a demux input port, and a plurality of demux output ports on a single side. In particular, the shared AWG includes a first waveguide pattern having an input end for receiving a plurality of optical signals, each optical signal of the plurality of optical signals have a different associated channel wavelength of a first plurality of channel wavelengths, and an output end for outputting a multiplexed optical signal having each channel wavelength of the first plurality of wavelengths. In addition, the shard AWG includes a second waveguide pattern with an input end for receiving a multiplexed optical signal with a second plurality of channel wavelengths and an output end for outputting at least first and second optical signals, each of the first and second optical signals having a different (or unique) portion of channel wavelengths of the second plurality of channel wavelengths. To this end, the first and second demux output ports may be accurately described as outputting partially separated channel wavelengths based on the second waveguide pattern performing coarse-grain demultiplexing to separate portions/groups of channel wavelengths rather than each individual channel wavelength.

The plurality of mux input ports optically couple a plurality of transmitter optical subassembly (TOSA) modules to the input end of the first waveguide pattern, e.g., via optical fibers, and a mux output port optically couples the mux input ports to a transmit (TX) waveguide, e.g., an optical fiber, to launch an output multiplexed optical signal (or transmit multiplexed optical signal) thereon. Likewise, the demux input port optically couples an external receive (RX) waveguide to the input end of the second waveguide pattern, and a plurality of demux output ports optically couple at least first and second demultiplexing devices of the multi-channel ROSA to an output end of the second waveguide pattern. The first and second waveguide patterns may each be generally U-shaped such that the respective input and output ports are located on the same side.

Placing each of the aforementioned ports on a single side of the shared AWG reduces the size of the shared AWG footprint and thus decreases the total length of the transceiver. In optical multiplexers with mux input ports and a mux output port on opposite ends, for example, optical fibers are coupled to the ports at the opposite ends of the optical multiplexer. Thus, separate fiber arrays and fiber coupling structures are used at each end and space must be provided for the optical fibers at each end to allow for the desired bend radius of the optical fibers. Bending the optical fibers too much may result in loss of optical power and/or damage to the fibers. By eliminating the fiber coupling on one side, the footprint of shared AWG and the length of the transceiver/transmitter is reduced.

In addition, providing a two-stage demultiplexing scheme as disclosed herein allows for, in a general sense, a transparent bridge that enables eight (8) or more channel wavelengths to be passed through to demultiplexing devices that are configured with, for instance, a maximum channel capacity of four (4) channels. Accordingly, relatively inexpensive demultiplexers (e.g., readily available 4-channel AWGs) provided by the multi-channel ROSA can off-load a majority of the work to separate each individual wavelength at a fine-grain level for detection purposes, while the shared AWG having a maximum channel count of at least five (5) channels, and preferably eight (8) or more channels, performs coarse-grain channel wavelength separation in predetermined groups/portions. To this end, widely-available 4-channel PD arrays, transimpedance amplifiers, and supporting circuitry can be advantageously utilized to reduce costs, complexity, and ultimately increase yield. Although the present disclosure specifically discusses 8-channel transceiver modules capable of at least 100 Gbps, and preferably at least 400 Gbps, other channel count configurations and data rates are within the scope of this disclosure.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another along a light path without bends/turns and without the use of an intermediate device such as a fiber.

Referring to FIG. 1, an optical transceiver 100, consistent with embodiments of the present disclosure, is shown and described. The optical transceiver 100 is illustrated in a highly simplified form for purposes of clarity and ease of description. In this embodiment, the optical transceiver 100 transmits and receives eight (8) channels using eight different channel wavelengths ($\lambda_1, \lambda_2, \lambda_3 \ldots \lambda_8$) and may be configured for coarse wavelength division multiplexing (CWDM), although other numbers of channels are possible and within the scope of this disclosure.

Each of the channel wavelengths ($\lambda_1, \lambda_2, \lambda_3 \ldots \lambda_8$) can be different, for instance, $\lambda_1$ may be about 1270 nm, channel wavelength $\lambda_2$ 1290 nm, channel wavelength $\lambda_3$ 1310 nm, and so on. The optical transceiver 100 may be capable of transmission rates of at least about 25 Gbps per channel, and preferably at least 50 Gbps per channel. The optical transceiver 100 may also be capable of both short transmission distances of tens of meters, for example, to distances of 2 kilometers or more. The optical transceiver 100 may be used, for example, in internet data center applications or fiber to the home (FTTH) applications.

In an embodiment, the optical transceiver 100 implements a Quad Small Form-Factor Plugging (QSFP) transceiver. For example, the optical transceiver 100 may be implemented within a QSFP transceiver that comports with the "QSFP-DD Hardware Specification for QSFP Density 8× Pluggable Transceiver—Rev. 4.0" published on Sep. 18, 2018. In another example, the optical transceiver 100 may be implemented within a QSFP transceiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP-DD, QSFP28 or QFSP+ transceivers.

The optical transceiver 100 includes a multi-channel transmitter optical subassembly (TOSA) 120 for transmitting optical signals on the channel wavelengths (e.g., $\lambda_1, \lambda_2, \lambda_3 \ldots \lambda_8$) and a multi-channel receiver optical subassembly (ROSA) 130 for receiving optical signals on the channel wavelengths (e.g., $\lambda_1, \lambda_2, \lambda_3 \ldots \lambda_8$).

As shown, the transceiver housing 102 includes a multi-channel TOSA 120, a multi-channel ROSA 130, and a shared optical demux/mux 112 disposed therein. The optical demux/mux 112 is discussed in greater detail below, and may also be referred to herein as a shared arrayed waveguide grating (AWG) 112, although the present disclosure is not limited to AWG-type devices. For example, the mux portion coupled to the multi-channel TOSA 120 can be implemented as a reversed PLC splitter instead of an AWG. Although a PLC splitter can have higher insertion loss than an AWG, the insertion loss is less likely to vary with temperature and is more consistent across channels, thereby providing improved channel-to-channel power stability.

Continuing on, the shared AWG 112 includes a plurality of ports all on the same side including a plurality of mux input ports 126-1 to 126-8 and a corresponding mux output port 128 to support operation of the multi-channel TOSA 120, and a demux input port 129 and corresponding plurality of demux output ports, namely first and second demux output ports 127-1, 127-2, to support operation of the multi-channel ROSA 130. Additional aspects of the shared AWG 112 will be discussed in greater detail below with reference to FIGS. 2-5.

A transmit connecting circuit 104 and a receive connecting circuit 108 provide electrical connections to the multi-channel TOSA 120 and the multi-channel ROSA 130, respectively, within the housing 102. The transmit connecting circuit 104 is electrically connected to the electronic components (e.g., the lasers, monitor photodiodes, etc.) in the multi-channel TOSA 120 and the receive connecting circuit 108 is electrically connected to the electronic components (e.g., the photodiodes, the TIAs, etc.) in the multi-channel ROSA 130. The transmit connecting circuit 104 and the receive connecting circuit 108 include at least conductive paths to provide electrical connections and may also include additional circuitry. The transmit connecting circuit 104 and the receive connecting circuit 108 may communicate with external systems via a data bus.

In this embodiment, the TOSA 120 includes a plurality of TOSA modules 124-1 to 124-8 optically coupled to the shared AWG 112, and in particular, to mux input ports 126-1 to 126-8 and mux output port 128. The TOSA modules 124-1 to 124-8 may be coupled to the mux input ports 126-1 to 126-8 of the shared AWG 112 using optical fibers 125, which may be referred to as mux input optical fibers. Although the shared AWG 112 is shown adjacent the TOSA modules 124-1 to 124-8 in this schematic diagram, the shared AWG 112 may be located at a distal end of the transceiver housing 102 away from the TOSA modules 124-1 to 124-8, as described in greater detail below. The TOSA modules 124-1 to 124-8 generate optical signals at different respective channel wavelengths (e.g., $\lambda_1$, $\lambda_2$, $\lambda_3$ ... $\lambda_8$) and the shared AWG 112 combines or multiplexes those optical signals to provide a multiplexed optical signal (or transmit/output multiplexed signal) on the mux output port 128 coupled to an output optical fiber 115 (or transmit optical fiber 115). The output optical fiber 115 is coupled to an output optical connector (or optical coupling port) 116, such as an LC connector. The optical coupling port 116 optically couples to a transmit (TX) waveguide (not shown), e.g., an optical fiber, for example.

Each of the TOSA modules 124-1 to 124-8 may have a coaxial configuration such that each TOSA module is electrically connected at one end to conductive paths on the transmit connecting circuit 104 and optically coupled at the other end. Each of the TOSA modules 124-1 to 124-8 may include a laser for generating laser light at the assigned channel wavelength and optics for coupling the laser light into the respective mux input ports of the shared AWG 112. The lasers in the TOSA modules 124-1 to 124-8 thus convert electrical data signals (TX_D1 to TX_D8) received via the transmit connecting circuit 104 into modulated optical signals coupled into the shared AWG 112. The lasers may include, for example, distributed feedback (DFB) lasers with diffraction gratings. Each of the TOSA modules 124-1 to 124-8 may also include a monitor photodiode for monitoring the light emitted by the lasers. Each of the TOSA modules 124-1 to 124-8 may further include one or more temperature control devices, such as a resistive heater and/or a thermoelectric cooler (TEC), for controlling a temperature of the lasers, for example, to control or stabilize the laser wavelengths.

In this embodiment, the shared AWG 112 optically couples to input optical fiber 117 by way of demux input port 129. The input optical fiber 117 (or input demux optical fiber 117) is coupled to an input optical connector (or optical coupling port) 118, such as an LC connector. The input optical connector 118 optically couples to a receive/input (RX) waveguide (not shown), e.g., an optical fiber, for example. The shared AWG 112 then receives a multiplexed optical signal (or input multiplexed optical signal) from the input optical fiber 117 having channel wavelengths $\lambda_1$, $\lambda_2$, $\lambda_3$ ... $\lambda_8$, for example. The shared AWG 112 then outputs a first portion of separated channel wavelengths (e.g., $\lambda_1$ to $\lambda_4$) via the first demux output port 127-1 and a second portion of separated channel wavelengths (e.g., $\lambda_5$ to $\lambda_8$) via the second demux output port 127-2.

A first optical demultiplexer 132-1 optically couples to the first demux output port 127-1, e.g., via an optical fiber, to receive the first portion of separated channel wavelengths, and a second optical demultiplexer 132-2 optically couples to the second demux output port 127-2, e.g., via an optical fiber, to receive the second portion of separated channel wavelengths. The optical fibers optical coupling demux output ports 127-1, 127-2 to the first and second demultiplexers 132-1, 132-2, respectively, may also be referred to as demux output fibers. The first and second optical demultiplexers 132-1, 132-2 output each individual channel wavelength on to first and second PD arrays 134-1, 134-2, respectively. First and second transimpedance amplifiers (TIAs) 136-1, 136-2, receive an electrical signal representing the separated channel wavelengths and then condition/output the same before outputting signals (RX_D1 to RX_D8) via the receive connecting circuit 108.

The relationship between the shared AWG 112 and the first and second optical demultiplexers 132-1, 132-2, may be accurately referred to as a cascading demultiplexing arrangement with at least two demultiplexing stages. In this arrangement, the AWG 112 divides a received multiplexed optical signal into two or more groups of wavelengths during the demultiplexing first stage. For example, in the context of the shown 8-channel optical signal, the shared AWG 112 outputs a first optical signal having channel wavelengths $\lambda_1$ to $\lambda_4$ and a second optical signal having channel wavelengths $\lambda_5$ to $\lambda_8$. The particular number of channel wavelengths for each demux output port is not necessarily equal. For example, the first demux output port 127-1 may output less than all of the total number of channel wavelengths and the second demux output port can 127-2 output the remainder.

Continuing on, each of the first and second optical signals are then output to a second demultiplexing stage comprising the first and second optical demultiplexers 132-1, 132-2. As shown, this stage transitions demultiplexing from the shared AWG 112 to the multi-channel ROSA 130. The first and second optical demultiplexers 132-1, 132-2 then separate channel wavelengths from the received first and second signals, respectively, and output the separated channel wavelengths on to the first and second PD arrays 134-1, 134-2.

Thus, and as discussed above, PD arrays 134-1, 134-2 and the transimpedance amplifiers 136-1, 136-2 detect and convert optical signals received from the first and second optical demultiplexers 132-1, 132-2 into electrical data signals (RX_D1 to RX_D8) that are output via the receive connecting circuit 108. Although one example of the multi-channel ROSA 130 is described, the optical transceiver 100 may include other types or embodiments of ROSAs.

Referring to FIGS. 2-5, an embodiment of a multi-channel optical transceiver 200 is shown and described in greater detail. The optical transceiver 200 includes a transceiver housing 202 with a cavity 203 having a mounting region 201 for housing TOSA components and ROSA components (not shown). The cavity 203 further includes a shared AWG 212 with mux input ports and an output port on one side is located at a distal end 202a of the transceiver housing 202.

In the illustrated embodiment, the shared AWG 212 is proximate a distal wall 207. The shared AWG 212 may also (directly) abut the distal wall 207 in an embodiment. The shared AWG 212 may be held at a predefined position at least in part by structure 211 extending from the housing 202. The shared AWG 212 may be a planar lightwave circuit (PLC) formed using, for instance, photolithography. In an embodiment, the shared AWG 212 is formed as monolithic structure whereby the AWG is formed as a single piece, e.g., using Silicon (Si) or other suitable material, and mux/demux waveguides 501-1, 501-2 (See FIG. 5), can be patterned/formed thereon. As shown, the AWG 212 include a substrate/base 511 formed of Si or other suitable material, with the substrate 511 providing the surface 504 for patterning/formation of waveguides 501-1, 501-2.

Figure 2:
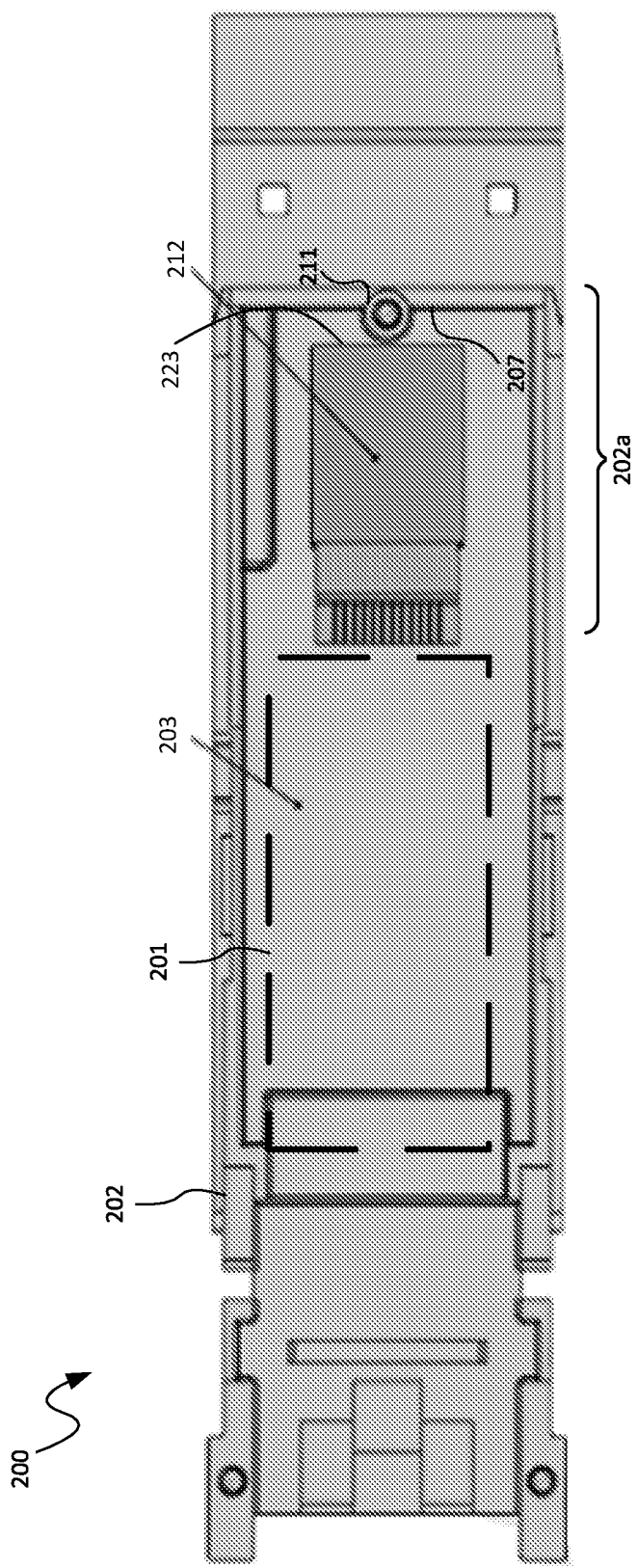
FIG. 2 is a top view of an embodiment of a multi-channel transceiver including a shared AWG with input and output ports on a single side, consistent with the present disclosure.
Figure 3:
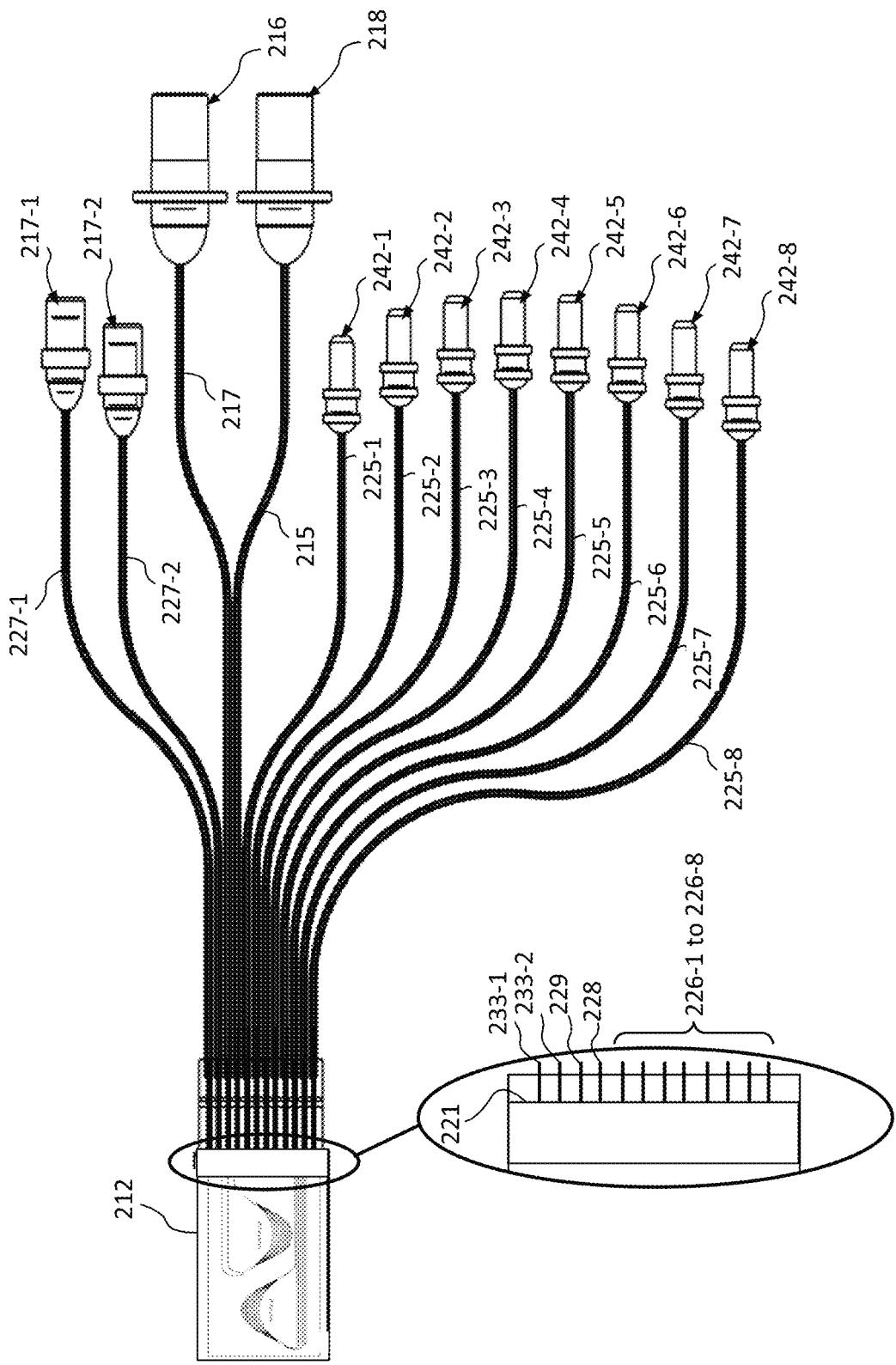
FIG. 3 is a top view of the shared AWG shown in FIG. 2 optically coupled to a plurality of input/output optical fibers, in accordance with an embodiment of the present disclosure.

As shown in greater detail in FIG. 3, with reference to FIG. 2, the shared AWG 212 includes a plurality of mux input ports 226-1 to 226-8 and a mux output port 228 all on the same side 221 (herein referred to as the optical coupling side). The distal side 223 of AWG 212 (e.g., opposite the optical coupling side 221) is adjacent to or abutting the distal wall 207 of the transceiver housing 202 and the optical coupling side 221 is directed/facing toward the other TOSA components in the transceiver housing 202 (See FIG. 2). This arrangement facilitates optical coupling with the shared AWG 212 using optical fibers, e.g., optical fibers 215, 217, 227-1, 227-2, 225-1 to 225-8, and optical coupling ports 216, 218, without unnecessary bends in the optical fibers thus reducing fiber bending losses.

As further shown, the shared AWG 212 also includes a demux input port 229 and a plurality of demux output ports 233-1, 233-2, all also on the same optical coupling side 221. This arrangement also facilitates optical coupling with the first and second optical demultiplexers 132-1, 132-2 (FIG. 1) using optical fibers 227-1, 227-2 and optical coupling receptacle 216 without unnecessary bends in the optical fibers thus reducing fiber bending losses. The demux input optical fiber and the demux output optical fibers can be directly coupled, e.g., as shown, to the demux input port 229 and the plurality of demux outputs port 233-1, 233-2, respectively.

Figure 4:
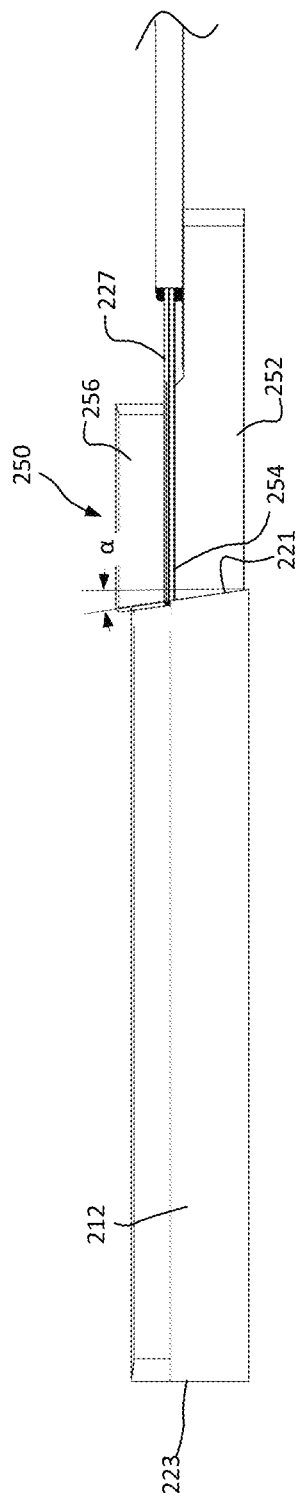
FIG. 4 is a side view of the shared AWG shown in FIG. 2, in accordance with an embodiment of the present disclosure.

As further shown in FIG. 3, with additional reference to FIG. 4, a fiber array holder 250 is used to hold input demux fiber 217 in alignment with and optically coupled to demux input port 229 and the demux output ports 233-1, 233-2 and respective demux output optical fibers 227-1, 227-2. Optical connectors 217-1, 217-2, e.g., mini LC connectors, then optically couple the output demux optical fibers 227-1, 227-1 to the first and second demultiplexers 132-1, 132-2, respectively (FIG. 1).

Continuing on, the fiber array holder 250 is also used to hold input mux optical fibers 225-1 to 225-8 and output optical fiber 215 in alignment with and optically coupled to the respective mux input ports 226-1 to 226-8 and the mux output port 228 on the optical coupling side 221 of the shared AWG 212. In this embodiment, the fiber array holder 250 includes a base portion 252 (FIG. 4) with V-shaped grooves 254 receiving the respective optical fibers and a top portion 256 securing the fibers in the V-shaped grooves 254.

The optical coupling side 221 may be angled with an angle α relative to a line perpendicular to the top and/or bottom surface of the shared AWG 212. The fiber array holder 250 has a corresponding angled coupling face to allow angled fiber ends to be coupled to angled input ports, which reduces back reflection and improves coupling efficiency. In one example, the length of the shared AWG 212 with the fiber array holder 250 may be less than 20 mm and more specifically about 15 mm, and the width of the shared AWG 212 may be less than 5 mm and more specifically about 4.0 mm.

The mux input optical fibers 225-1 to 225-8 are optically coupled to a plurality of TOSA modules 124-1 to 124-8 using TOSA optical coupling assemblies (not shown). In an embodiment, the TOSA modules 124-1 to 124-8 can be located in another section of the housing 202 such that the shared AWG 212 is spaced from the TOSA modules 124-1 to 124-8 to reduce thermal effects from the heat generated by the TOSA modules 124-1 to 124-8.

The TOSA optical coupling assemblies may include one or more optical coupling ferrules 242-1 to 242-8 (See FIG. 3), which are inserted into coupling receptacles extending from the TOSA modules 124-1 to 124-8 to provide optical alignment and coupling. Known optical coupling assemblies may be used such as LC/UPC coupling ferrules. The mux output port 228 of the shared AWG 212 is optically coupled to an output optical connector 216 using the output optical fiber 227 (see FIG. 2). The output optical connector 216 may be a known optical connector such as an LC receptacle.

Figure 5:
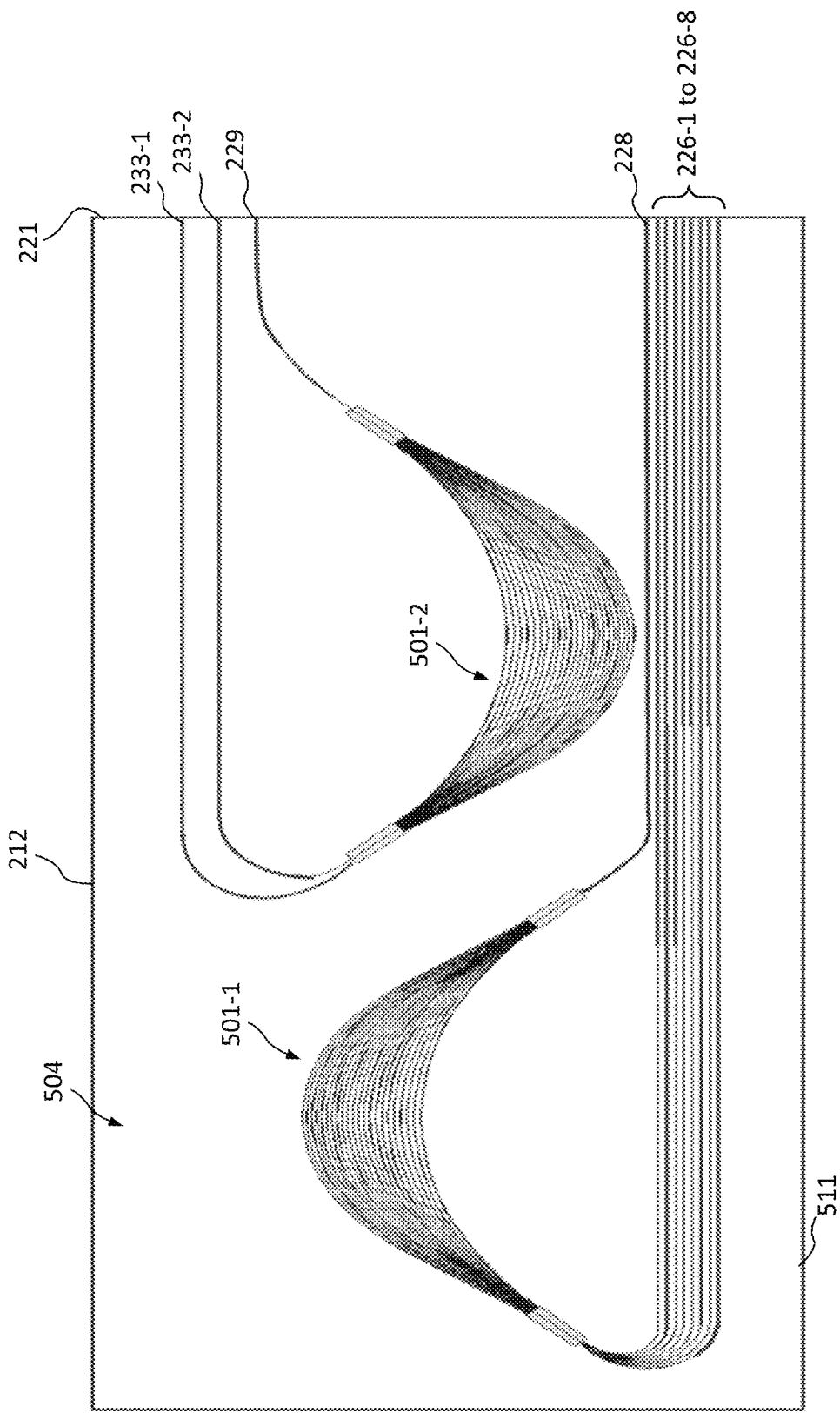
FIG. 5 shows a plurality of example waveguide patterns for the shared AWG of FIG. 2, in accordance with an embodiment of the present disclosure.

Turning to FIG. 5, an embodiment shows a portion of the shared AWG 212, and in particular, a first and second waveguide pattern 501-1, 501-2 that each generally form a U-shaped arrangement. The first waveguide pattern 501-1 extends from a first end having the mux input ports 226-1 to 226-8 and then turns back 180 degrees back to the same optical coupling end at a second end along the optical coupling side 221 such that the mux input ports 226-1 to 226-8 and the mux output port 228 are located on the same optical coupling side. Stated differently, the first waveguide pattern 501-1 extends from a first end at least partially across the AWG 212 along a route that ends at the second end, with the first and second ends being both proximate the same optical coupling side. The first end and the second end of the first waveguide pattern 501-1 may also be referred to as an input end and an output end, respectively. Likewise, the second waveguide pattern 501-2 extends from the demux input port 229 at a first end and then turns 180 degrees back to the same optical coupling side 221 at a second end such that the first and second demux output ports 233-1, 233-2 and the demux input port 229 are located on the same optical coupling side. The first end and the second end of the second waveguide pattern 501-2 may also be referred to as an input end and an output end, respectively.

According, the first waveguide pattern 501-1 is a 8:1 mux pattern whereby eight input ports optically couple to a single output port, with the single output port providing a multiplexed channel wavelength with eight (8) different channel wavelengths. On the other hand, the second waveguide pattern 501-2 is a 1:2 demux pattern whereby one input port optically couples to two output ports, with each of the two output ports outputting a different portion of the channel wavelengths introduced to the input port. In the context of the example embodiment of FIG. 5, this includes each of the demux output ports 233-1, 233-2 outputting 4-channels each. For example, the first demux output port 233-1 can output channel wavelengths $\lambda_1$ to $\lambda_4$ and the second demux output port 233-2 can output channel wavelengths $\lambda_5$ to $\lambda_4$. However, this disclosure is not necessarily limited in this regard. For instance, each of the first and second demux output ports 233-1, 233-2 may output an even/odd separation of channel wavelengths whereby the first demux output port 233-1 outputs channel wavelengths $\lambda_1$, $\lambda_3$, $\lambda_5$, $\lambda_7$ and the second demux output port 233-2 outputs channel wavelengths $\lambda_2$, $\lambda_4$, $\lambda_6$, $\lambda_8$. The particular demux channel wavelength output configuration may vary depending on a desired application, and the specific examples provided above are not intended to limit the present disclosure. The first and second waveguide patterns 501-1, 501-2 are disposed on the same surface 504 (e.g., are coplanar) in a side-by-side configuration.

In accordance with an aspect of the present disclosure an arrayed waveguide grating (AWG) for use in an optical transceiver is disclosed. The AWG comprising a plurality of mux input ports for optically coupling to a plurality of transmitter optical subassembly (TOSA) modules to receive a plurality of optical signals, each optical signal of the plurality of optical signals having a different associated channel wavelength of a first plurality of channel wavelengths, a mux output port for optically coupling to a transmit (TX) waveguide to launch a first multiplexed optical signal thereon, the first multiplexed optical signal having each channel wavelength of the first plurality of channel wavelengths, a demux input port for optically coupling to a receive (RX) waveguide to receive a second multiplexed optical signal having a second plurality of channel wavelengths, and a plurality of demux output ports for optically coupling to at least first and second demultiplexing devices of a receiver optical subassembly (ROSA) to provide first and second optical signals, respectively, each of the first and second optical signals having a different portion of channel wavelengths of the second plurality of channel wavelengths.

In accordance with another aspect of the present disclosure a multi-channel optical transceiver is disclosed. The multi-channel optical transceiver comprising a transceiver housing, a plurality of transmitter optical subassembly (TOSA) modules located in the transceiver housing for transmitting a plurality of optical signals at different respective channel wavelengths, a multi-channel receiver optical subassembly (ROSA) located in the transceiver housing for receiving at least first and second optical signals and detecting optical signals at each of the channel wavelengths, a shared arrayed waveguide grating (AWG) located in the transceiver housing and optically coupled to the plurality of TOSA modules for multiplexing the plurality of optical signals into an output multiplexed optical signal including the different channel wavelengths, and optically coupled to the multi-channel ROSA for demultiplexing a receive multiplexed optical signal and outputting partially separated channel wavelengths, and wherein the shared AWG includes a plurality of mux input ports optically coupled to the respective TOSA modules with mux input optical fibers for receiving the plurality of optical signals and a mux output port optically coupled to a transmit optical fiber for outputting the multiplexed optical signal, a demux input port optically coupled with a demux input optical fiber to receive an input multiplexed optical signal, and a plurality of demux output ports optically coupled to the multi-channel ROSA with demux output optical fibers for providing the separated channel wavelengths to the multi-channel ROSA via the first and second optical signals, and wherein the plurality of mux input ports, the mux output port, the demux input port, and the plurality of demux output ports are located on a same side of the shared AWG.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An arrayed waveguide grating (AWG) for use in an optical transceiver, the AWG comprising:

- a plurality of mux input ports for optically coupling to a plurality of transmitter optical subassembly (TOSA) modules to receive a plurality of optical signals, each optical signal of the plurality of optical signals having a different associated channel wavelength of a first plurality of channel wavelengths;
- a mux output port for optically coupling to a transmit (TX) waveguide to launch a first multiplexed optical signal thereon, the first multiplexed optical signal having each channel wavelength of the first plurality of channel wavelengths;
- a demux input port for optically coupling to a receive (RX) waveguide to receive a second multiplexed optical signal having a second plurality of channel wavelengths;
- a plurality of demux output ports for optically coupling to at least first and second demultiplexing devices of a receiver optical subassembly (ROSA) to provide first and second optical signals, respectively, each of the first and second optical signals having a different portion of channel wavelengths of the second plurality of channel wavelengths; and
- a first waveguide pattern having an input end optically coupled to the plurality of mux input ports for receiving the plurality of optical signals, and an output end optically coupled to the mux output port for outputting the first multiplexed optical signal; and
- a second waveguide pattern with the input end optically coupled to the demux input port for receiving the second multiplexed optical signal comprising the second plurality of channel wavelengths and an output end optically coupled to the plurality of demux output ports for outputting the first and second optical signals.

2. The AWG of claim 1, wherein each of the first and second waveguide patterns include first and second ends disposed proximate a same end of the AWG.

3. The AWG of claim 1, wherein the first waveguide pattern extends between the plurality of mux input ports and the mux output port with a generally U-shaped pattern, and wherein the second waveguide pattern extends between demux input port and the plurality of demux output ports with a generally U-shaped pattern.

4. The AWG of claim 1, wherein the second waveguide pattern is configured to separate the second plurality of channel wavelengths into two different portions of channel wavelengths such that the first and second optical signals include an equal number of different channel wavelengths.

5. The AWG of claim 1, wherein the second waveguide pattern is configured to separate the second plurality of channel wavelengths into two different portions of channel wavelengths such that the first and second optical signals include an unequal number of different channel wavelengths.

6. The AWG of claim 1, wherein the plurality of mux input ports, mux output port, demux input port, and plurality of demux output ports are located on a same side of the AWG.

7. The AWG of claim 1, wherein a total number of mux input ports is at least five (5) and the total number of demux output ports is at least five (5).

8. A multi-channel optical transceiver comprising:
a transceiver housing;
a plurality of transmitter optical subassembly (TOSA) modules located in the transceiver housing for transmitting a plurality of optical signals at different respective channel wavelengths;

a multi-channel receiver optical subassembly (ROSA) located in the transceiver housing for receiving at least first and second optical signals and detecting optical signals at each of the channel wavelengths;

a shared arrayed waveguide grating (AWG) located in the transceiver housing and optically coupled to the plurality of TOSA modules for multiplexing the plurality of optical signals into an output multiplexed optical signal including the different channel wavelengths, and optically coupled to the multi-channel ROSA for demultiplexing a receive multiplexed optical signal and outputting partially separated channel wavelengths; and wherein the shared AWG includes a plurality of mux input ports optically coupled to the respective TOSA modules with mux input optical fibers for receiving the plurality of optical signals and a mux output port optically coupled to a transmit optical fiber for outputting the multiplexed optical signal, a demux input port optically coupled with a demux input optical fiber to receive an input multiplexed optical signal, and a plurality of demux output ports optically coupled to the multi-channel ROSA with demux output optical fibers for providing the separated channel wavelengths to the multi-channel ROSA via the first and second optical signals, and wherein the plurality of mux input ports, the mux output port, the demux input port, and the plurality of demux output ports are located on a same side of the shared AWG; and wherein the shared AWG includes a first waveguide pattern extending between the plurality of mux input ports and the mux output port with a generally U-shaped pattern, and wherein the shared AWG further includes a second waveguide pattern extending between the input demux port and the plurality of demux output ports with a generally U-shaped pattern.

9. The multi-channel optical transceiver of claim 8, wherein the shared AWG is located at a distal end of the transceiver housing, and wherein the shared AWG has an optical input end facing away from the distal end.

10. The multi-channel optical transceiver of claim 8, wherein the plurality of demux output ports include at least first and second demux output ports, each of the first and second demux output ports providing a first and a second group of different channel wavelengths, respectively.

11. The multi-channel optical transceiver of claim 10, wherein the multi-channel ROSA includes first and second demultiplexing devices optically coupled to first and second demux output ports, respectively, of the plurality of demux output ports, the shared AWG providing a first demultiplexing stage and the first and second demultiplexing devices providing a second demultiplexing stage, the second demultiplexing stage separating each of the channel wavelengths received via the first and second demux output ports and providing the separated channel wavelengths to photodiodes to detect each respective channel wavelength separated by the second demultiplexing stage.

12. The multi-channel optical transceiver of claim 11, wherein the shared AWG is configured to receive the input multiplexed optical signal having eight (8) different channel wavelengths and output a first optical signal having four (4) of the eight (8) different channel wavelengths via the first demux output port and a second optical signal having the other four (4) of the eight (8) different channel wavelengths via the second demux output port during the first demultiplexing stage, and wherein each of the first and second demultiplexing devices of the second demultiplexing stage are four-channel demultiplexers.

13. The multi-channel optical transceiver of claim 11, wherein the shared AWG is configured to receive the input multiplexed optical signal and output the first optical signal having less than all of the channel wavelengths of the input multiplexed optical signal and the second optical signal having the remainder of the channel wavelengths of the input multiplexed optical signal.

14. The multi-channel optical transceiver of claim 11, wherein each of the first and second demultiplexing devices of the second demultiplexing stage are implemented as arrayed waveguide gratings (AWGs).

15. The multi-channel optical transceiver of claim 8, wherein the plurality of TOSA modules include at least eight (8) TOSA modules, each of the plurality of TOSA modules being configured to transmit an optical signal at a transmission rate of at least about 25 Gbps.

16. The multi-channel optical transceiver of claim 8, further including a fiber array holder holding at least the mux input optical fibers of the plurality of TOSA modules and the demux output optical fibers of the multi-channel ROSA.

17. The multi-channel optical transceiver of claim 8, wherein the demux input optical fiber and the demux output optical fibers are directly coupled to the demux input port and the plurality of demux outputs ports, respectively.

18. The multi-channel optical transceiver of claim 8 implemented as a Small Form-factor Pluggable (SFP) transceiver module capable of transmitting and receiving at least 100 Gigabits per second.

* * * * *